(12) United States Patent
Ranade

(10) Patent No.: US 8,234,469 B2
(45) Date of Patent: Jul. 31, 2012

(54) BACKUP OF VIRTUAL MACHINES USING CLONED VIRTUAL MACHINES

(75) Inventor: Dilip Ranade, Pune (IN)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 12/500,238

(22) Filed: Jul. 9, 2009

(65) Prior Publication Data

US 2011/0010515 A1    Jan. 13, 2011

(51) Int. Cl.
*G06F 12/00* (2006.01)

(52) U.S. Cl. ............... 711/162; 711/1; 711/6; 711/100; 711/161; 707/602; 707/610; 707/646; 707/681; 707/682; 707/683; 707/684; 718/1

(58) Field of Classification Search .............. 711/115, 711/161, 162, E12.001, E12.103, 1, 6, 100; 707/602, 610, 646, 681–684; 718/1
See application file for complete search history.

(56) References Cited

U.S. PATENT DOCUMENTS

| | | | |
|---|---|---|---|
| 2008/0098154 | A1 | 4/2008 | Traut et al. |
| 2008/0104588 | A1* | 5/2008 | Barber et al. ............... 718/1 |
| 2008/0163210 | A1 | 7/2008 | Bowman et al. |
| 2008/0244028 | A1 | 10/2008 | Le et al. |
| 2009/0007106 | A1 | 1/2009 | Araujo et al. |
| 2009/0037680 | A1 | 2/2009 | Colbert et al. |
| 2009/0113109 | A1* | 4/2009 | Nelson et al. ............... 711/6 |
| 2010/0107158 | A1* | 4/2010 | Chen et al. .................. 718/1 |

FOREIGN PATENT DOCUMENTS

GB    2445105 A   *   6/2008

OTHER PUBLICATIONS

"Online Backup and Recovery of Virtual Server Environments", retrieved at <<http://www.ironmountain.com/resources/server-protect/wp_online_backup_and_recovery.pdf>>, White Paper, 2008, pp. 8.
Zheng, et al., "justRunIt: Experiment-Based Management with Xen", retrieved at <<http://www.xen.org/files/xensummit_oracle09/xensummit_justrunit.pdf>>, presentations from the Xen Summit North America 2009, Feb. 24-25, 2009, pp. 3.
"Virtual Machine Backup Guide", retrieved at <<http://www.vmware.com/pdf/vi3_35/esx_3/r35u2/vi3_35_25_u2_vm_backup.pdf>>, Mar. 13, 2009, pp. 86.
Lagar-Cavilla, et al., "SnowFlock: Rapid Virtual Machine Cloning for Cloud Computing", retrieved at <<http://sysweb.cs.toronto.edu/publication_files/102/LagarCavillaEurosys09.pdf>>, in Proceedings of the 4th ACM SIGOPS/EuroSys European Conference on Computer Systems (EuroSys 2009), Apr. 1-3, 2009, pp. 12.

\* cited by examiner

*Primary Examiner* — Tuan Thai
*Assistant Examiner* — Zhuo Li

(57) ABSTRACT

A system and method for creating a backup of a virtual machine running on a host computer is described herein. The system and method operate by creating a copy or "clone" of a virtual machine running on a first host computer on a second host machine connected thereto. After generation of the clone, a backup of the virtual hard disk of the clone can be obtained in a manner that does not consume any resources of the first host machine. The backup of the virtual hard disk of the clone can then be used as the backup of the original virtual machine.

18 Claims, 14 Drawing Sheets

BACKUP OF VIRTUAL MACHINES USING CLONED VIRTUAL MACHINES

BACKGROUND

The term virtual machine may be used to refer to a software implementation of a physical machine, such as a computer, that executes programs like a physical machine. FIG. 1 is a block diagram of an example system 100 that implements a virtual machine in a conventional manner. As shown in FIG. 1, system 100 includes a system hardware layer 102 that represents the actual physical resources of a computer, which may include for example one or more central processing units (CPUs), system memory, a storage device such as a disk, a graphics adapter, a network adapter, input/output (I/O) devices, or the like. A host operating system 104 is executed upon physical hardware layer 102. A virtualization layer 106 runs on top of host operating system 104 and supports one or more virtual machines $108_1$-$108_N$. For example, virtualization layer 106 emulates certain hardware elements such that each of virtual machines $108_1$-$108_N$ can operate as if it has access to its own dedicated set of physical resources. One or more guest operating systems $110_1$-$110_N$ are executed on corresponding virtual machines $108_1$-$108_N$ and support the execution of application programs thereon. In an alternate implementation, virtualization layer 106 may run directly on top of system hardware layer 102.

Virtual machines have become increasingly popular platforms for deploying both desktops and servers. FIG. 2 is a block diagram of an example system 200 in which a plurality of servers are deployed on corresponding virtual machines $202_1$-$202_N$ resident on a single host computer 200. As shown in FIG. 2, server operating systems $204_1$-$204_N$ execute on corresponding virtual machines $202_1$-$202_N$ and server application(s) $206_1$-$206_N$ execute within the context of corresponding server operating systems $204_1$-$204_N$. By consolidating multiple virtual machines onto host computer 200 in this manner, the utilization of host computer 200 can be increased, thereby increasing the return on investment in host computer 200. This consolidation may also allow fewer host computers to be used in an enterprise network or other computing environment, thereby reducing consumption of power, cooling, and/or floor space. Managing fewer host computers can also lead to improved efficiencies as there are fewer opportunities for error and breakdown.

By networking multiple host computers together, certain other advantages can be realized. FIG. 3 is a block diagram of a conventional computing environment 300 in which a plurality of host computers $302_1$-$302_N$ are networked together via a communication infrastructure 306. Data storage 308, which may comprise a storage area network (SAN) or other non-volatile data storage system, is also connected to communication infrastructure 306 and provides external, shared data storage for host computers $302_1$-$302_N$. In an alternate implementation, internal data storage associated with each host computer is shared with the other host computer(s) via communication infrastructure 306 or some other communication medium.

As shown in FIG. 3, a virtual machine 304 is running on host computer $302_1$. Virtual machine management systems exist that may be used to migrate virtual machine 304 from host computer $302_1$ to host computer $302_N$, where it is denoted virtual machine 304'. Virtual machine migration generally refers to the movement of a virtual machine from a first physical machine to a second physical machine. This migration process is represented by a dashed arrow in FIG. 3. Depending upon the implementation, such migration may be performed after virtual machine 304 has been shut down and/or while virtual machine 304 is still executing. If a virtual disk associated with virtual machine 304 is stored in data storage 308, then migration may be facilitated by simply changing ownership of the virtual disk from virtual machine 304 to virtual machine 304'. Virtual machine migration advantageously enables technology managers to perform load balancing or to redeploy virtual machines in the event a host computer fails or needs to be taken off-line for maintenance.

To protect data, it is desirable to obtain periodic backups of virtual machines just as it is desirable to obtain periodic backups of physical machines. However, obtaining periodic backups of virtual machines in the same way it is done which physical machines can give rise to difficulties.

In a conventional enterprise computing scenario, a backup agent running on a virtual machine operates to generate backup data and transfer it over a communication infrastructure to a backup server. This approach may be referred to as agent-based backup. As discussed above in reference to FIG. 2, there are benefits associated with consolidating numerous virtual machines on a single host computer. However, if several virtual machines on a highly-loaded host computer are backed up at the same time, the extra load imposed by the operations of the backup agents can overload the host computer. Furthermore, the management of backup agents on virtual machines can become difficult in computing environments in which the number of virtual machines is very large and/or in which virtual machines can be migrated between host computers (such as computing environment 300 of FIG. 3).

To avoid some of these issues associated with agent-based backup, a backup of an entire virtual machine can instead be obtained by the host computer itself in an implementation in which a virtual disk associated with the virtual machine is maintained on the host file system. Such a backup may also be obtained by a data storage system connected to the host computer in an implementation in which the virtual disk is mapped directly to a block device within the data storage system. These approaches may be referred to as host-level backup and volume-level backup, respectively. However, for various reasons, such backups are typically created from snapshots of a virtual disk that are in a state equivalent to just after an unexpected machine crash, termed "crash-consistent snapshots." Thus, these backups may not provide a desired level of consistency.

Another backup approach termed "off-host backup" or "consolidated backup" attempts to reduce the loading of the host computer on which the virtual machine is located and a communication infrastructure attached thereto. In accordance with this approach, a snapshot is obtained of the virtual disk associated with the virtual machine. In order to obtain a more consistent snapshot than a crash-consistent snapshot, the application(s) running on the virtual machine may be quiesced prior to obtaining the snapshot. A backup server then mounts the snapshot of the virtual disk image and obtains a file-level backup therefrom. While this approach can help prevent overloading of the host computer and reduce traffic on the communication infrastructure, it still cannot yield a perfectly consistent backup.

What is needed then is an approach for obtaining backups of virtual machines, such as virtual machines used to deploy servers in an enterprise network or other computing environment, in a manner that addresses the shortcoming associated with the aforementioned prior art approaches.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system and method for creating a backup of a virtual machine running on a host computer is described herein. Generally speaking, the system and method operate by creating a copy or "clone" of a virtual machine running on a first host computer on a second host computer connected thereto. After generation of the clone, a backup of the virtual hard disk of the clone can be obtained in a manner that does not consume any resources of the first host machine. The backup of the virtual hard disk of the clone can then be used as the backup of the original virtual machine.

The system and method advantageously operates in a manner that does not require a backup agent to be executed within the original virtual machine. Thus, issues relating to host computer overloading and management of backup agents, as described in the Background Section above, can be avoided.

Furthermore, in certain embodiments, the cloned virtual machine is created in a manner that causes only minimal interruption to the original virtual machine, and applications executing thereon, thereby allowing backups to be obtained at any time and in a manner that is unlikely to substantially impact the performance of the applications and/or frustrate users thereof.

Additionally, because the cloned virtual machine can be shut down in an orderly fashion prior to obtaining the backup, a perfectly consistent backup can be obtained.

In particular, a method for creating a backup of a first virtual machine running on a first host computer in a network of host computers is described herein. In accordance with the method, a second virtual machine is generated in a running state on a second host computer in the network of host computers, the second virtual machine being a copy of the first virtual machine. A snapshot of a virtual disk associated with the second virtual machine is then obtained. A first backup is crated based on at least the snapshot of the virtual disk associated with the second virtual machine. In accordance with one embodiment, the snapshot of the virtual disk associated with the second virtual machine is obtained by initiating an orderly shutdown of the second virtual machine and by obtaining the snapshot of the virtual disk associated with the second virtual machine after the orderly shutdown of the second virtual machine is complete.

A system is also described herein. The system includes a first host computer and a second host computer. The first host computer includes a first virtualization layer, a first virtual machine executing on the first virtualization layer, first cloning logic within the first virtualization layer, and first backup logic. The second host computer is connected to the first host computer and includes a second virtualization layer, second cloning logic within the second virtualization layer, and second backup logic. The first and second cloning logic are configured to generate a second virtual machine on the second host computer responsive to the initiation of a backup process by the first and/or second backup logic, the second virtual machine being a copy of the first virtual machine. The second backup logic is configured to obtain a snapshot of a virtual disk associated with the second virtual machine and to create a first backup based on at least the snapshot of the virtual disk associated with the second virtual machine. In one embodiment, the second backup logic is configured to initiate an orderly shutdown of the second virtual machine and obtain the snapshot of the virtual disk associated with the second virtual machine after the orderly shutdown of the second virtual machine is complete.

A further method for creating a backup of a first virtual machine running on a first host computer in a network of host computers is described herein. In accordance with the method, a second virtual machine is generated in a running state on a second host computer in the network of host computers, the second virtual machine being a copy of the first virtual machine. A snapshot is obtained of a virtual disk associated with the second virtual machine. A third virtual machine is then generated in a running state on the second host computer, the third virtual machine being a copy of the first virtual machine. A snapshot of a virtual disk associated with the third virtual machine is obtained. An incremental backup is then created based on at least the snapshot of the virtual disk associated with the second virtual machine and the snapshot of the virtual disk associated with the third virtual machine.

In one implementation of the foregoing method, creating the incremental backup includes a number of steps. These steps include tracking changes to a virtual disk associated with the first host computer between a point in time at which the virtual disk associated with the first host computer was copied to create the virtual disk associated with the second virtual machine and a point in time at which the virtual disk associated with the first host computer was copied to create the virtual disk associated with the third virtual machine. These steps further include tracking changes to the virtual disk associated with the second virtual machine between a point in time at which the virtual disk associated with the second virtual machine was created and a point in time at which the snapshot of the virtual disk associated with the second virtual machine was obtained. These steps still further include tracking changes to the virtual disk associated with the third virtual machine between a point in time at which the virtual disk associated with the third virtual machine was created and a point in time at which the snapshot of the virtual disk associated with the third virtual machine was obtained.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
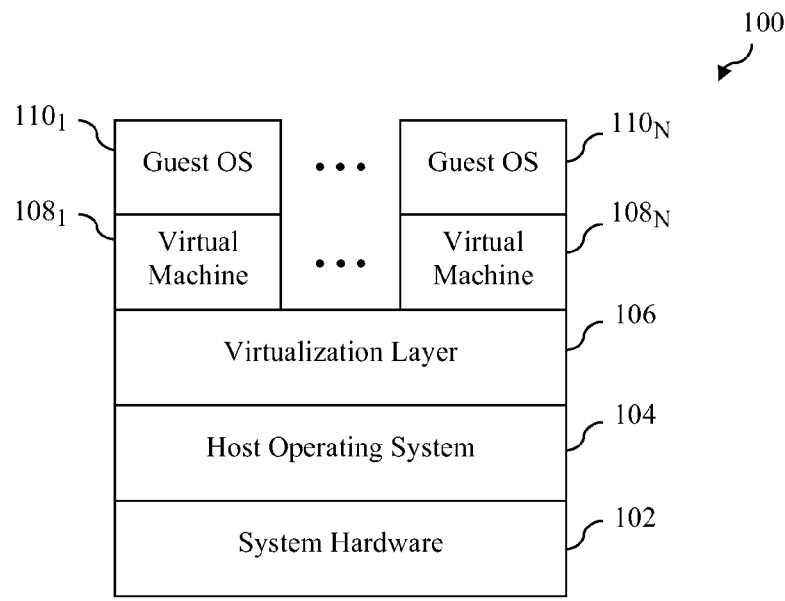
FIG. 1 is a block diagram of an example system that implements a virtual machine in a conventional manner.
Figure 2:
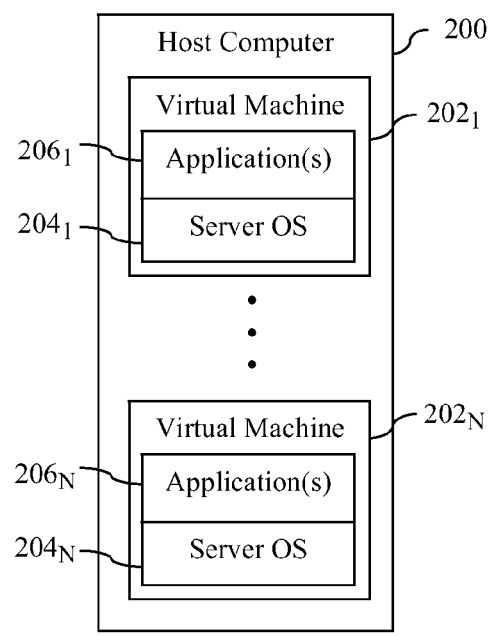
FIG. 2 is a block diagram of an example system in which multiple servers are deployed on a single host machine through the use of virtual machines.
Figure 3:
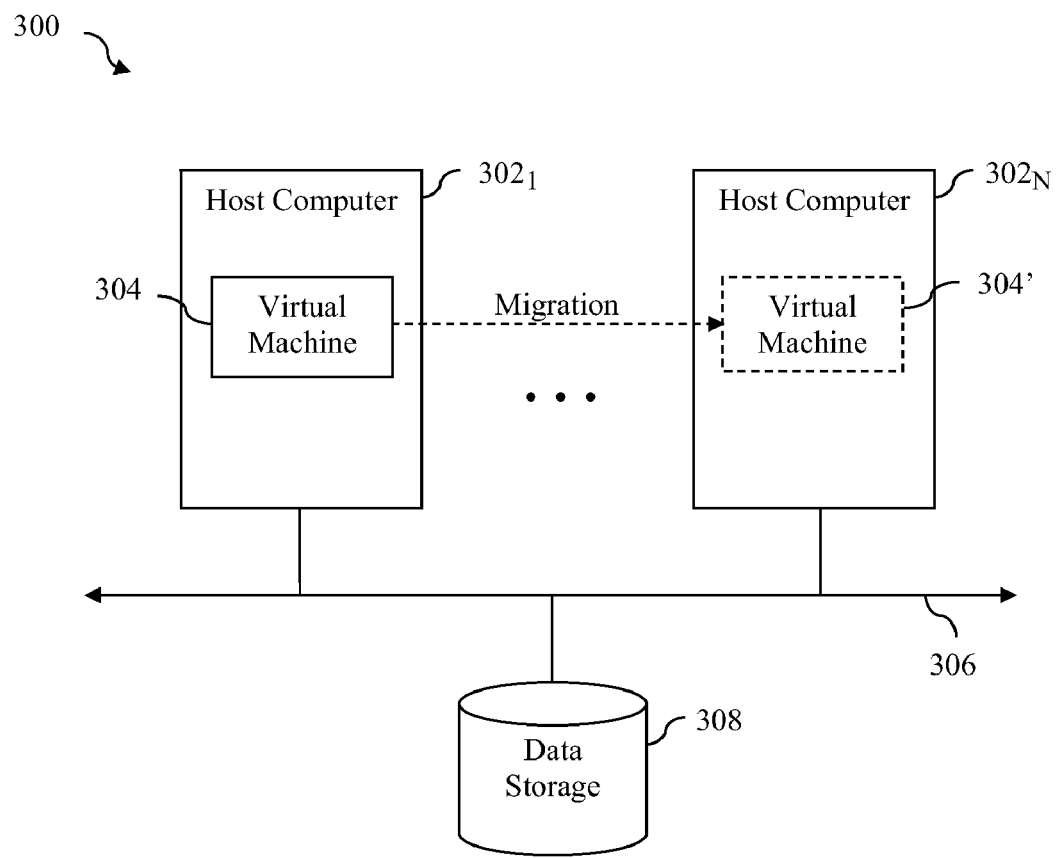
FIG. 3 is a block diagram of a conventional computing environment in which a plurality of host machines are networked together and in which a virtual machine may be migrated from a first host machine to a second host machine.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

A system and method for creating a backup of a virtual machine running on a host computer is described herein. Generally speaking, the system and method operate by creating a copy or "clone" of a virtual machine running on a first host computer on a second host machine that is connected thereto. After generation of the clone, a backup of the virtual hard disk of the clone can be obtained in a manner that does not consume any resources of the first host machine. The backup of the virtual hard disk of the clone can then be used as the backup of the original virtual machine.

The system and method advantageously operates in a manner that does not require a backup agent to be executed within the original virtual machine. Thus, issues relating to host computer overloading and management of backup agents, as described in the Background Section above, can be avoided.

Furthermore, in certain embodiments, the cloned virtual machine is created in a manner that causes only minimal interruption to the original virtual machine, and applications executing thereon, thereby allowing backups to be obtained at any time and in a manner that is unlikely to substantially impact the performance of the applications and/or frustrate users thereof.

Additionally, because the cloned virtual machine can be shut down in an orderly fashion prior to obtaining the backup, a perfectly consistent backup can be obtained. To better understand this concept, some explanation of the terms "crash-consistent backup," "application-consistent backup" and "perfectly consistent backup" will now be provided.

Backup programs often create backups based on a series of point-in-time (PIT) images of the data being protected. A typical mechanism for obtaining a PIT image for a virtual machine is to obtain a snapshot of a virtual disk associated with the virtual machine. The consistency of the resulting snapshot will depend on the amount of preparation performed. Three classifications may be used to describe the consistency of the resulting snapshot and the backups created based on such snapshots: crash-consistent, application-consistent and perfectly consistent.

A crash-consistent snapshot is a snapshot in which the virtual disk is in a state equivalent to just after an unexpected machine crash. In accordance with such a snapshot, application and file system updates are not guaranteed to be complete. Such a snapshot will only be useful if the application that owned the data and underlying file system is designed to recover from a crash and only after post-processing has occurred. Such post-processing involves the performance of crash recovery by the application and file system, which typically involves re-processing transaction logs.

To generate an application-consistent snapshot, pre-processing must be performed before creating the snapshot. Typically, a backup agent running on the virtual machine temporarily quiesces the application such that no new update requests are serviced and in-core updates are flushed out. Similarly, the backup agent causes unwritten pages in the file system to be flushed out. The snapshot is taken while the system is in this quiesced state. Once the snapshot is created, the application is allowed to proceed. A mechanism is used to interlock the quiescing with snapshot creation. Although the quiescing is performed by the backup agent running on the virtual machine, the snapshot is typically created elsewhere (e.g., the host operating system or a data storage system).

If the virtual machine has been shut down in an orderly fashion, the application stack will have written down everything to the virtual disk in a completely consistent fashion. The virtual disk may be said to be in a perfectly consistent state at this time and a snapshot of the virtual disk in this state may be termed a perfectly consistent snapshot. Since obtaining a perfectly consistent snapshot requires the virtual machine to be completely shut down, adopting this approach to obtaining backups will necessarily involve an interruption of service. As will be described herein, an embodiment of the present invention enables a perfectly consistent backup of a virtual machine to be obtained without shutting down the virtual machine and with very little degradation in performance of the virtual machine.

Figure 4:
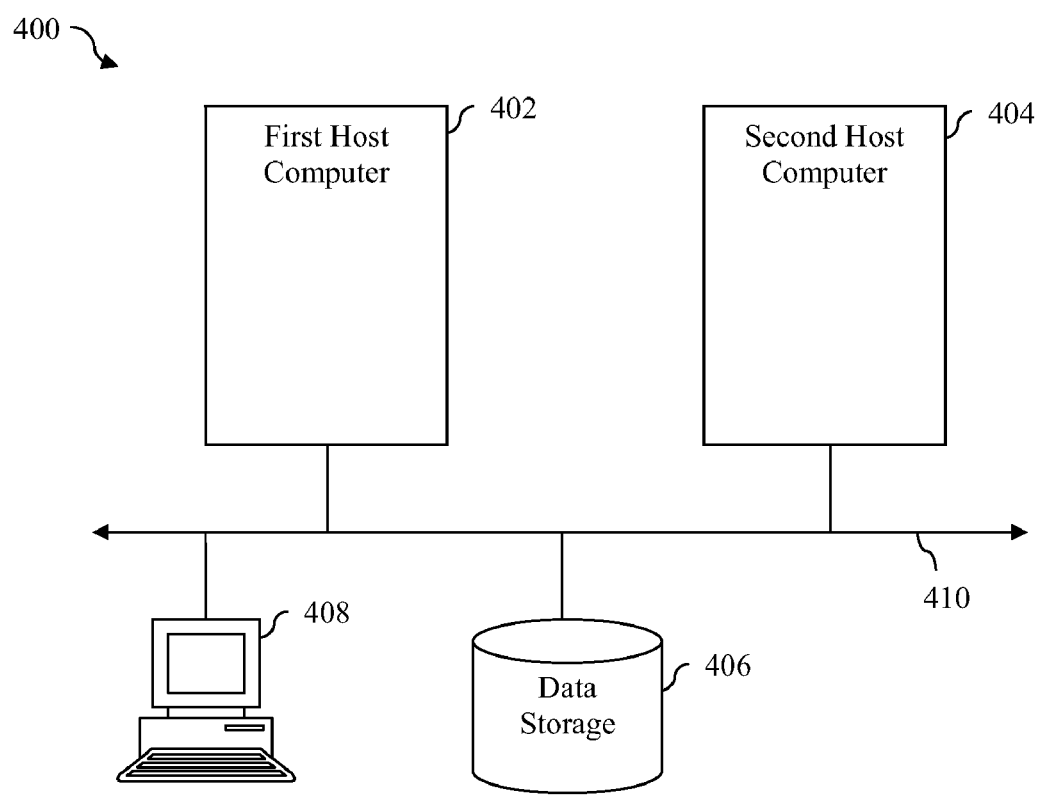
FIG. 4 is a block diagram of an example computing environment in which an embodiment of the present invention may operate.

B. Example Systems and Methods for Performing Backups of Virtual Machines Using Cloned Virtual Machines FIG. 4 is a block diagram of an example computing environment 400 in which an embodiment of the present invention may operate. Example computing environment 400 is presented herein by way of example only and is not intended to be limiting. Persons skilled in the relevant art(s) will readily appreciate that embodiments of the present invention may operate in computing environments other than that shown in FIG. 4.

As shown in FIG. 4, example computing environment 400 includes a first host computer 402 and a second host computer 404, each of which is connected to the other via a communication infrastructure 410. Computing environment 400 may include additional host computers (not shown in FIG. 4) that are attached to communication infrastructure 410. Data storage 406, which may comprise a storage area network (SAN) or other non-volatile data storage system, is also connected to communication infrastructure 410 and provides external, shared data storage for the host computers. In an alternate implementation, internal data storage associated with each host computer 402 and 404 is shared with the other host computer(s) via communication infrastructure 410 or some other communication medium. Computing environment 400 also includes at least one user computer 408 which is connected to host computers 402 and 404 via communication infrastructure 410 and may be used to manage or interact with host computers 402 and 404 and/or processes executing thereon.

Figure 5:
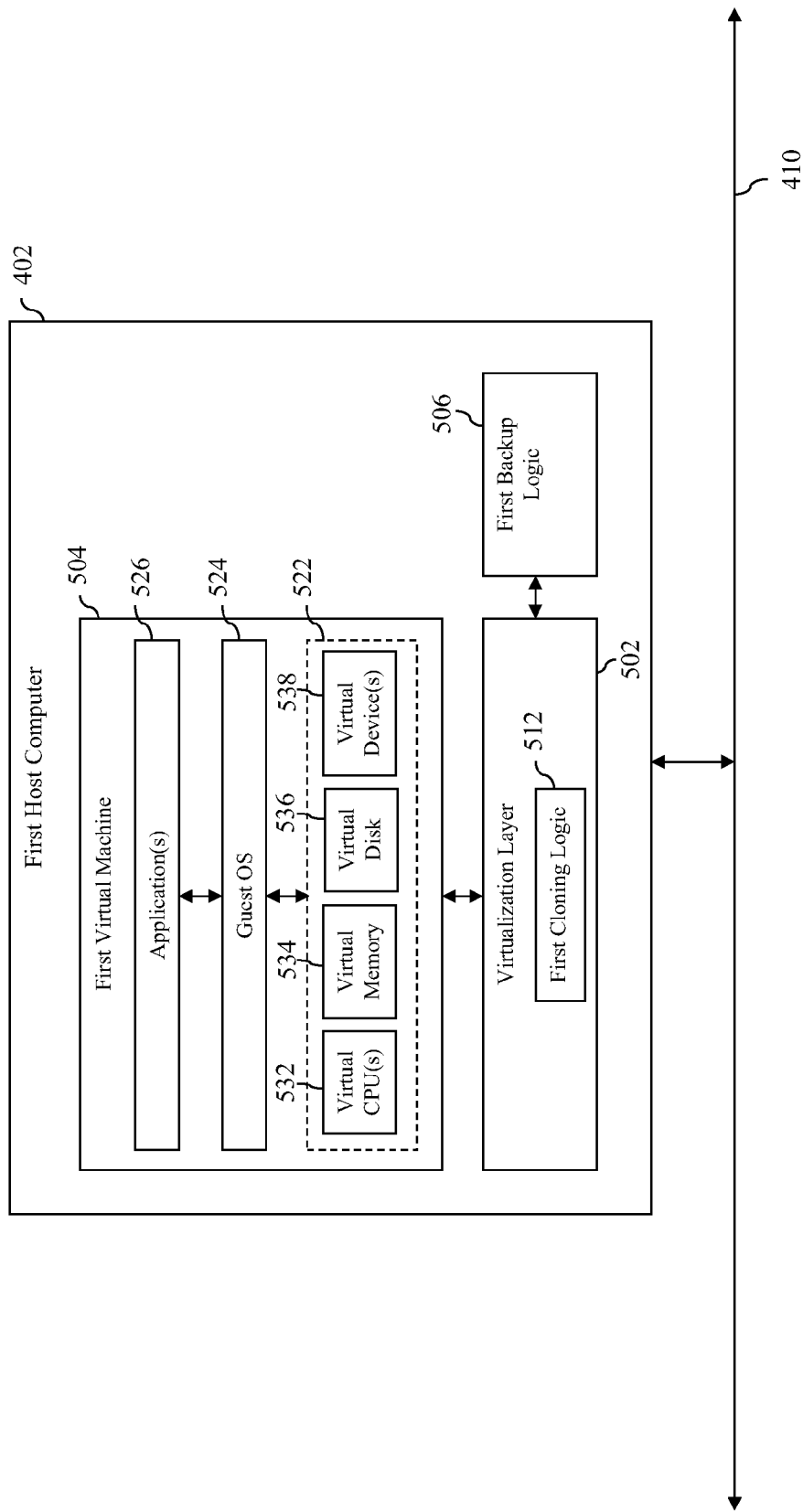
FIG. 5 is a block diagram that shows a first host computer in the computing environment of FIG. 4 in more detail.

FIG. 5 is a block diagram showing first host computer 402 in more detail. As shown in FIG. 5, first host computer 402 includes a virtualization layer 502 that is configured to perform operations relating to the generation and managed execution of one or more virtual machines on first host computer 402. Virtualization layer 502 may run on top of a host operating system, which in turn runs on top of a system hardware layer of first host computer 402. In an alternate implementation, virtualization layer 502 may run directly on top of a system hardware layer of first host computer 402. The aforementioned host operating system and system hardware layer have not been shown in FIG. 5 merely to conserve space. As used herein, the statement that a first entity runs or executes "on" or "on top of" a second entity is meant to indicate that the first entity utilizes resources of the second entity during execution.

Virtualization layer 502 supports the execution of a first virtual machine 504. Virtualization layer 502 performs this function, in part, by emulating certain hardware elements 522 such that first virtual machine 504 can operate as if it has access to its own dedicated set of physical resources. These emulated hardware elements 522 include one or more virtual central processing units (CPUs) 532, a virtual physical memory 534, a virtual disk 536, and one or more virtual devices 538. Virtual devices 538 may include, for example, a virtual graphics adapter, a virtual network adapter, a virtual input/output (I/O) device, or the like. It is noted that virtualization layer 502 may also support the execution of additional virtual machines beyond first virtual machine 504, although such additional virtual machines are not shown in FIG. 5.

A guest operating system 524 is executing on first virtual machine 504 and supports the execution of one or more applications 526 thereon. Application(s) 526 may be used to provide services to a user of first host computer 402, user computer 408, or another computer that is connected to first host computer 402 via communication infrastructure 410 or some other communication infrastructure.

As further shown in FIG. 5, first host computer 402 includes first backup logic 506. First backup logic 506 is configured to perform operations related to backing up first virtual machine 504. These operations include managing steps involved in creating a copy or "clone" of first virtual machine 504 on another host computer, such as second host computer 404. The steps involved in creating the copy of first virtual machine 504 on another host computer may be performed by first cloning logic 512 located within virtualization layer 502. The cloning process and the overall process for backing up first virtual machine 504 will be described in more detail herein. Depending upon the implementation, first backup logic 506 may be executed on top of the host operating system of first host computer 402, on top of virtualization layer 502, or even on top of the system hardware layer of first host computer 402. Alternatively, first backup logic 506 may be an integrated part of virtualization layer 502.

Figure 6:
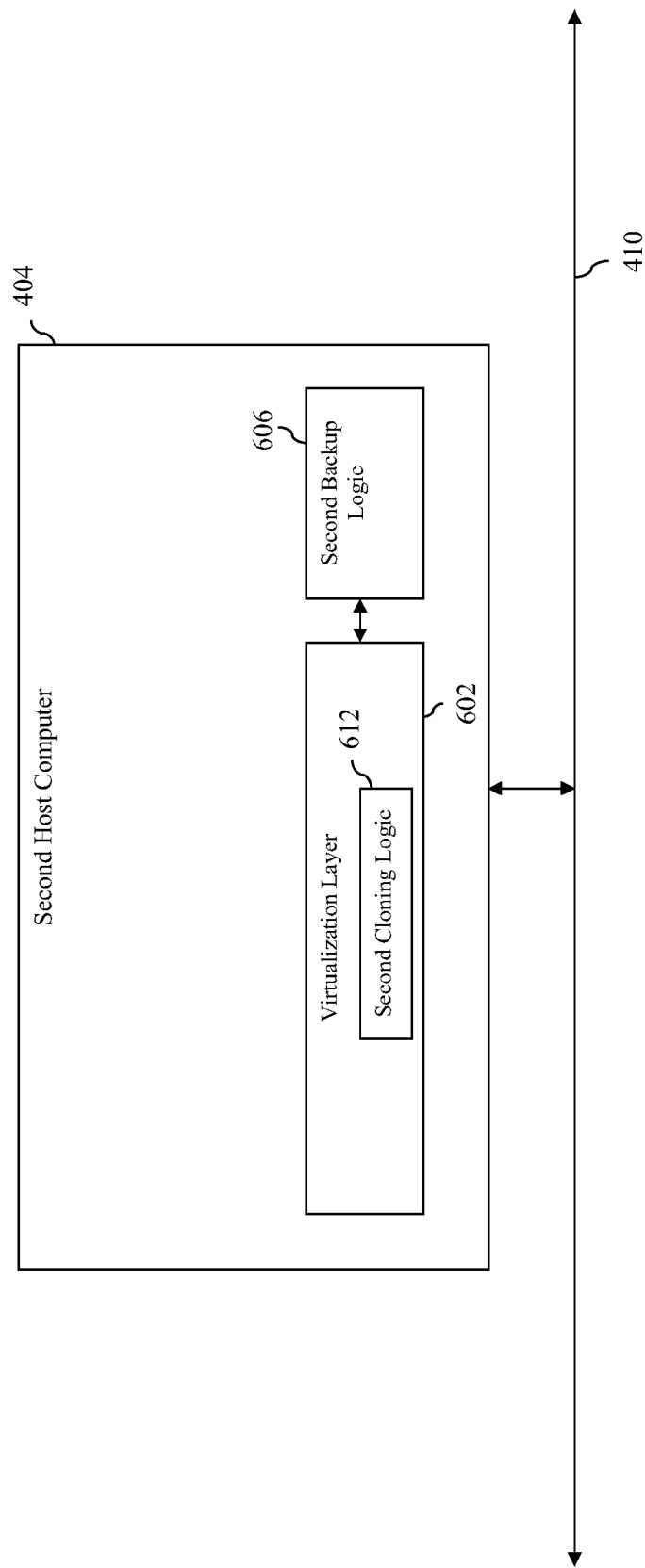
FIG. 6 is a block diagram that shows a second host computer in the computing environment of FIG. 4 in more detail at a point in time prior to the execution of a virtual machine backup process.

FIG. 6 is a block diagram showing second host computer 404 of example computing environment 400 in more detail. The block diagram shown in FIG. 6 is intended to represent second host computer 404 at a point in time prior to the execution of the aforementioned process for backing up first virtual machine 504. As shown in FIG. 6, second host computer 404 includes a virtualization layer 602 that is configured to perform operations relating to the generation and managed execution of one or more virtual machines on second host computer 404. Virtualization layer 602 may be configured to perform these operations in a like manner to that of virtualization layer 502 of first host computer 402, as described above. Virtualization layer 602 may be may run on top of a host operating system, which in turn runs on top of a system hardware layer of second host computer 404. In an alternate implementation, virtualization layer 602 may run directly on top of a system hardware layer of second host computer 404. The aforementioned host operating system and system hardware layer have not been shown in FIG. 6 merely to conserve space.

As further shown in FIG. 6, second host computer 404 includes second backup logic 606. Second backup logic 606 is configured to perform operations related to backing up a virtual machine running on another host computer, such as first virtual machine 504 running on first host computer 402. These operations include managing steps involved in creating a copy or "clone" of the virtual machine on second host computer 404. The steps involved in creating the copy of the virtual machine may be performed by second cloning logic 612 located within virtualization layer 602. Second backup logic 606 is further configured to obtain a snapshot of a virtual disk associated with the copied virtual machine and to create a backup based on at least the snapshot of the virtual disk associated with the copied virtual machine. The cloning process and the overall process for backing up the virtual machine will be described in more detail herein. Depending upon the implementation, second backup logic 606 may be executed on top of the host operating system of second host computer 404, on top of virtualization layer 602, or even on top of the system hardware layer of second host computer 404. Alternatively, second backup logic 606 may be an integrated part of virtualization layer 602.

Figure 7:
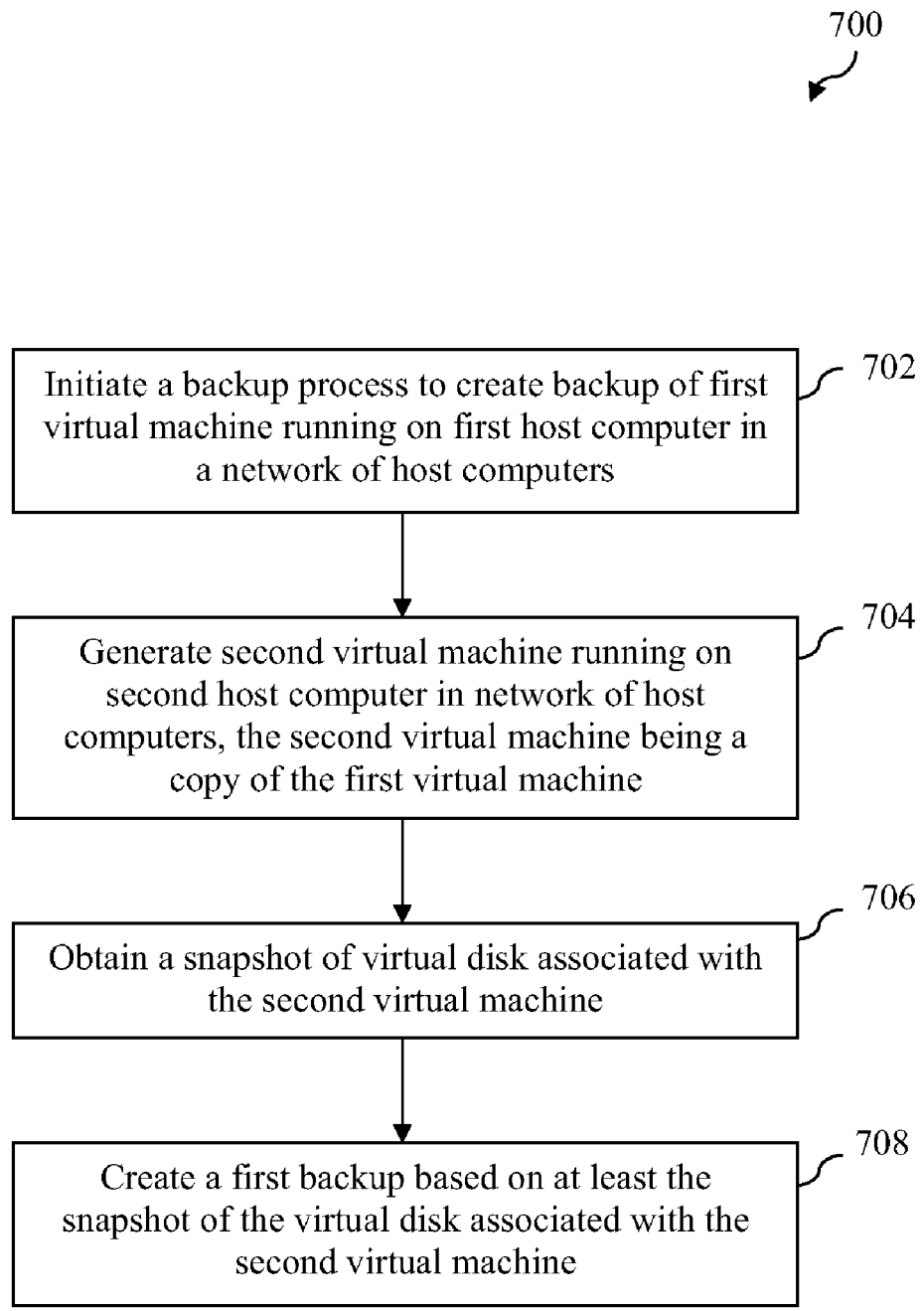
FIG. 7 depicts a flowchart of a method for generating a backup of a first virtual machine running on a first host computer in a network of host computers.

FIG. 7 depicts a flowchart 700 of a method for backing up a virtual machine in accordance with an embodiment of the present invention. The method of flowchart 700 will be described with continued reference to various entities within computing environment 400 of FIG. 4 for the purpose of illustration only. However, the method is not limited to that embodiment. As will be readily appreciated by persons skilled in the relevant art(s) based on the teachings provided herein, the method may be implemented by a wide variety of other entities and/or systems.

As shown in FIG. 7, the method of flowchart 700 begins at step 702 in which a backup process is initiated to create a backup of a first virtual machine running on a first host computer in a network of host computers. For example, with continued reference to computing environment 400 of FIG. 4, the backup process may be initiated to create a backup of first virtual machine 504 running on first host computer 402. In one implementation, the execution of the backup process is jointly managed by first backup logic 506 executing on first host computer 402 and second backup logic 606 executing on second host computer 404. In accordance with such an implementation, first backup logic 506 and/or second backup logic 606 may initiate the backup process responsive to the receipt of user input, wherein such input may be provided via a user interface of user computer 408, first host computer 402, second host computer 404, or another computer that is connected to first host computer 402 and/or second host computer 404 via communication infrastructure 410 or some other communication infrastructure. The backup process may also be automatically initiated by first backup logic 506 and/or second backup logic 606. For example, first backup logic 506 and/or second backup logic 606 may automatically initiate the backup process in accordance with a predefined backup schedule or responsive to the detection of one or more predefined events. In a further implementation, another entity other than first backup logic 506 and second backup logic may initiate the backup process and then control first backup logic 506 and second backup logic 508 to perform the backup process.

At step 704, responsive to the initiation of the backup process in step 702, a second virtual machine running on a second host computer in the network of host computers is generated, wherein the second virtual machine is a copy or "clone" of the first virtual machine. For example, with continued reference to computing environment 400 of FIG. 4, a second virtual machine may be generated in a running state on second host computer 404 that is a copy or "clone" of first virtual machine 504 running on first host computer 402. In one implementation, various steps involved in generating the copy of first virtual machine 504 on second host computer 404 are performed by first cloning logic 512 executing within virtualization layer 502 of first host computer 402 and second cloning logic 612 executing within virtualization layer 602 of second host computer 404 responsive to the initiation of the backup process by first backup logic 506 and/or second backup logic 606. Exemplary methods by which the cloned copy of the first virtual machine may be generated will be described in more detail below in reference to FIGS. 9 and 10.

Figure 8:
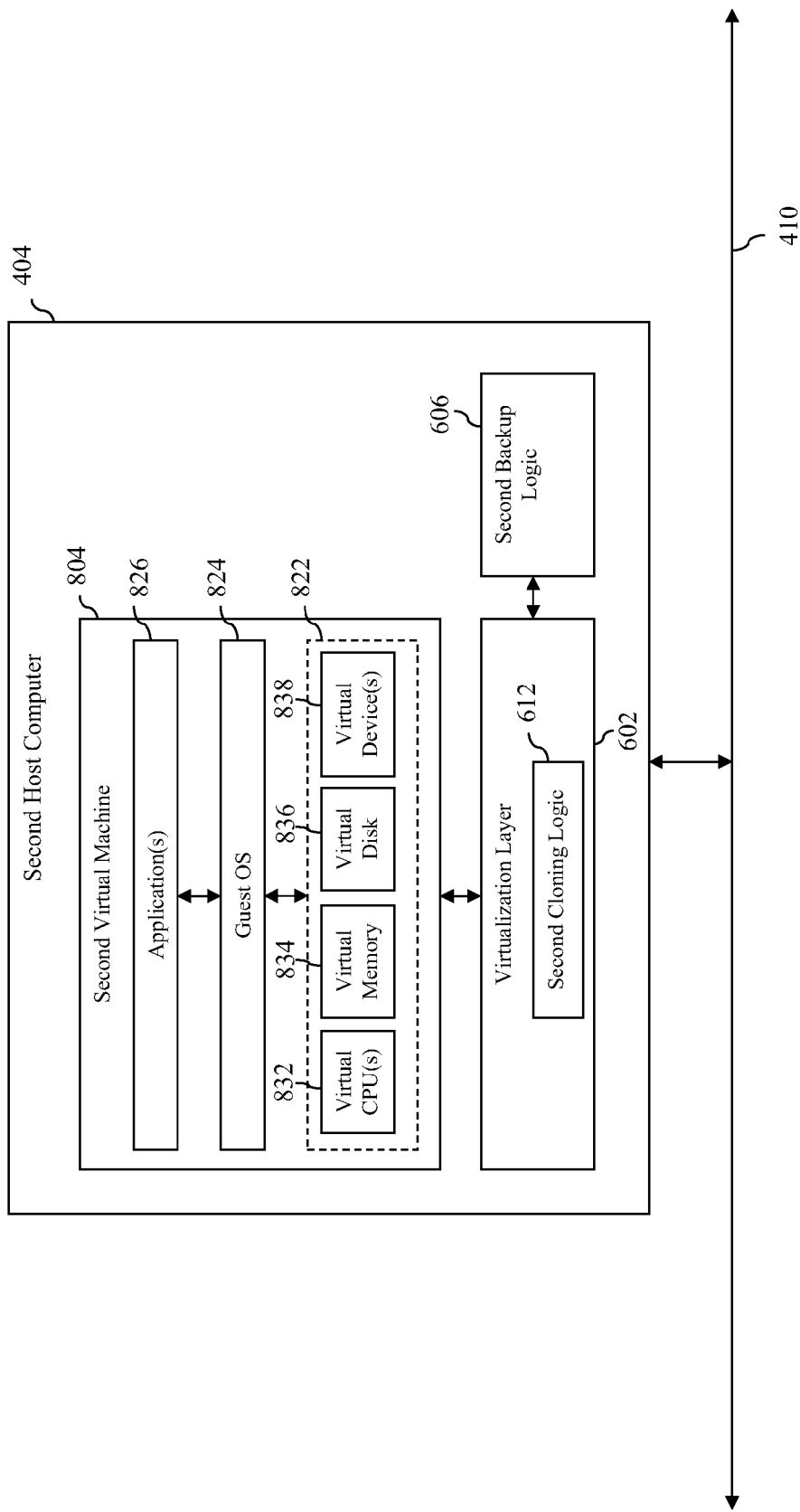
FIG. 8 is a block diagram that shows the second host computer in the computing environment of FIG. 4 after a copy of a first virtual machine running on the first host computer has been generated on the second host computer.

By way of further illustration, FIG. 8 is a block diagram of second host computer 404 after performance of step 704 of flowchart 700. As shown in FIG. 8, a second virtual machine 804 has been generated and is running on top of virtualization layer 602. Second virtual machine 804 is a copy or "clone" of first virtual machine 504. Accordingly, second virtual machine includes emulated hardware elements 822 which are copies of the emulated hardware elements 522 of FIG. 5 (e.g., virtual CPU(s) 832, virtual physical memory 834, virtual disk 836, and virtual device(s) 538 are copies of virtual CPU(s) 532, virtual physical memory 534, virtual disk 536, and virtual device(s) 538, respectively), a guest operating system 824 that is a copy of guest operating system 524 executing on first virtual machine 504, and one or more applications 826 executing on guest operating system 824 that are copies of application(s) 526 currently running on guest operating system 524.

Returning now to flowchart 700 of FIG. 7, at step 706, after the second virtual machine has been generated on the second host computer in the network of host computers, a snapshot of a virtual disk associated with the second virtual machine is obtained. For example, with continued reference to computing environment 400 of FIG. 4, a snapshot of virtual disk 836 associated with second virtual machine 804 may be obtained. In one implementation, the snapshot of virtual disk 836 is obtained by second backup logic 606 executing on second host computer 404. Additional details regarding how such a snapshot may be obtained will be described below in reference to FIGS. 11 and 12.

At step 708, a first backup is created based on at least the snapshot of the virtual disk associated with the second virtual machine that was obtained during step 706. For example, with continued reference to computing environment 400 of FIG. 4, second backup logic 606 executing on second host computer 404 may create the first backup based on at least the snapshot of virtual disk 836 associated with second virtual machine 804. Additional details regarding how the first and subsequent backups are created will be described below in reference to FIGS. 13-16.

In accordance with the foregoing method of flowchart 700, after generation of the second virtual machine in step 704, a backup of the virtual hard disk of the second virtual machine can advantageously be obtained in a manner that does not consume any resources of the first host machine. Since the second virtual machine is a copy of the first virtual machine, the backup of the virtual hard disk of the second virtual machine can be used as the backup of the virtual hard disk of the first virtual machine.

Figure 9:
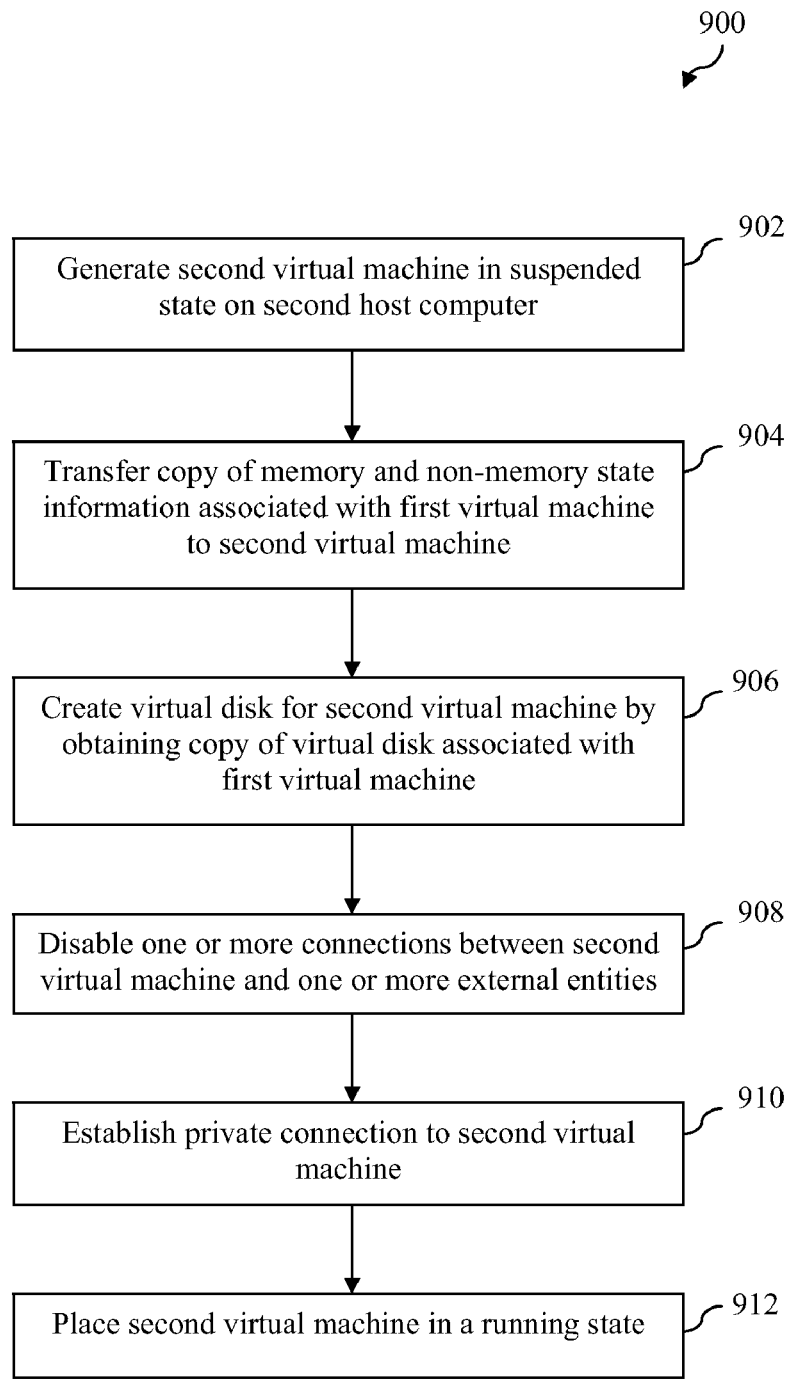
FIG. 9 depicts a flowchart of a method for generating a copy or "clone" of a first virtual machine running on a first host computer in a network of host computers on a second host computer in the network of computers.

FIG. 9 depicts a flowchart 900 of a method for generating a copy or "clone" of a first virtual machine running on a first host computer in a network of host computers on a second host computer in the network of computers in accordance with an embodiment of the present invention. The method of flowchart 900 may be used, for example, to perform step 704 of flowchart 700 as described above in reference to FIG. 7. The method of flowchart 900 will be described with continued reference to various entities within computing environment 400 of FIG. 4 for the purpose of illustration only. However, the method is not limited to that embodiment. As will be readily appreciated by persons skilled in the relevant art(s)

based on the teachings provided herein, the method may be implemented by a wide variety of other entities and/or systems.

As shown in FIG. 9, the method of flowchart 900 begins at step 902, in which a second virtual machine is generated in a suspended state on the second host computer. For example, with continued reference to computing environment 400 of FIG. 4, second cloning logic 612 may generate second virtual machine 804 in a suspended state on second host computer 404.

At step 904, a copy of memory and non-memory state information associated with the first virtual machine is transferred to the second virtual machine. For example, with continued reference to computing environment 400 of FIG. 4, first cloning logic 512 and second cloning logic 612 may operate in conjunction to transfer a copy of the memory and non-memory state information associated with first virtual machine 504 to second virtual machine 804. The memory state information may include, for example, information relating to the state of virtual physical memory 534 associated with first virtual machine 504. The non-memory state information may include, but is not limited to, information related to the state of virtual CPU(s) 532 associated with first virtual machine 504, including CPU registers, information related to the state of virtual device(s) 538 associated with first virtual machine 504 (such as, but not limited to, a motherboard, network adapter, graphics adapter, or input/output (I/O) device), and information related to the state of connections between first virtual machine 504 and devices external to the first host computer 202, including but not limited to connections to one or more networks, USB devices, SCSI storage devices, and removable media such as CD-ROMs. An exemplary method for transferring such memory and non-memory state information will be described below in reference to FIG. 10.

At step 906, a virtual disk is created for the second virtual machine by obtaining a copy of a virtual disk associated with the first virtual machine. For example, with continued reference to computing environment 400 of FIG. 4, first cloning logic 512 and second cloning logic 612 may operate in conjunction to create virtual disk 836 for second virtual machine 804 by obtaining a copy of virtual disk 536 associated with first virtual machine 504.

In an embodiment, virtual disk 836 is created by taking a writeable snapshot of virtual disk 536. In accordance with such an approach, rather than replicating each block in virtual disk 536, which may consume significant time and resources, writes to virtual disk 536 and virtual disk 836 that occur after the time of taking the snapshot are maintained, and the state of each virtual disk is viewed as the sum of the state of virtual disk 536 at the point in time the writeable snapshot was taken plus the writes that occurred to each virtual disk after that point in time. In this way, the copy of virtual disk 536 may be obtained instantaneously and the amount of storage necessary to create the copy may be reduced. However, this is merely one example of a technique for creating the copy of virtual disk 536 and other techniques may be used.

It is noted that the particular method used for obtaining the copy of virtual disk 536 may depend on where the data stored in virtual disk 536 is maintained. For example, the method used for obtaining the copy of virtual disk 536 when the data stored in virtual disk 536 is maintained in memory on first host computer 202 may be different from the method used when the data stored in virtual disk 536 is maintained in shared data storage 406.

At step 908, one or more connections between the second virtual machine and one or more external entities are disconnected. For example, with continued reference to computing environment 400 of FIG. 4, second cloning logic 612 may operate to disconnect one or more connections between second virtual machine 804 and one or more external entities. Such entities may include, for example and without limitation, one or more networks, one or more I/O devices (e.g., one or more serial I/O devices), a console, or the like. Step 908 is performed to ensure that the continued execution of the second virtual machine will not interfere with the ongoing operation of the first virtual machine, which is also connected to the same external entities.

At step 910, a private connection is established with the second virtual machine. For example, with continued reference to computing environment 400 of FIG. 4, second cloning logic 612 may operate to establish a private connection between second virtual machine 804 and an external entity, such as a console or a network interface having a different Internet Protocol (IP) address than a network interface associated with first virtual machine 504. As will be described in more detail herein, this private connection may then be used to perform steps to place second virtual machine 804 in a suitable state for performing a backup.

At step 912, the second virtual machine is placed in a running state. For example, with continued reference to computing environment 400 of FIG. 4, second cloning logic 612 may place second virtual machine 804 in a running state.

Figure 10:
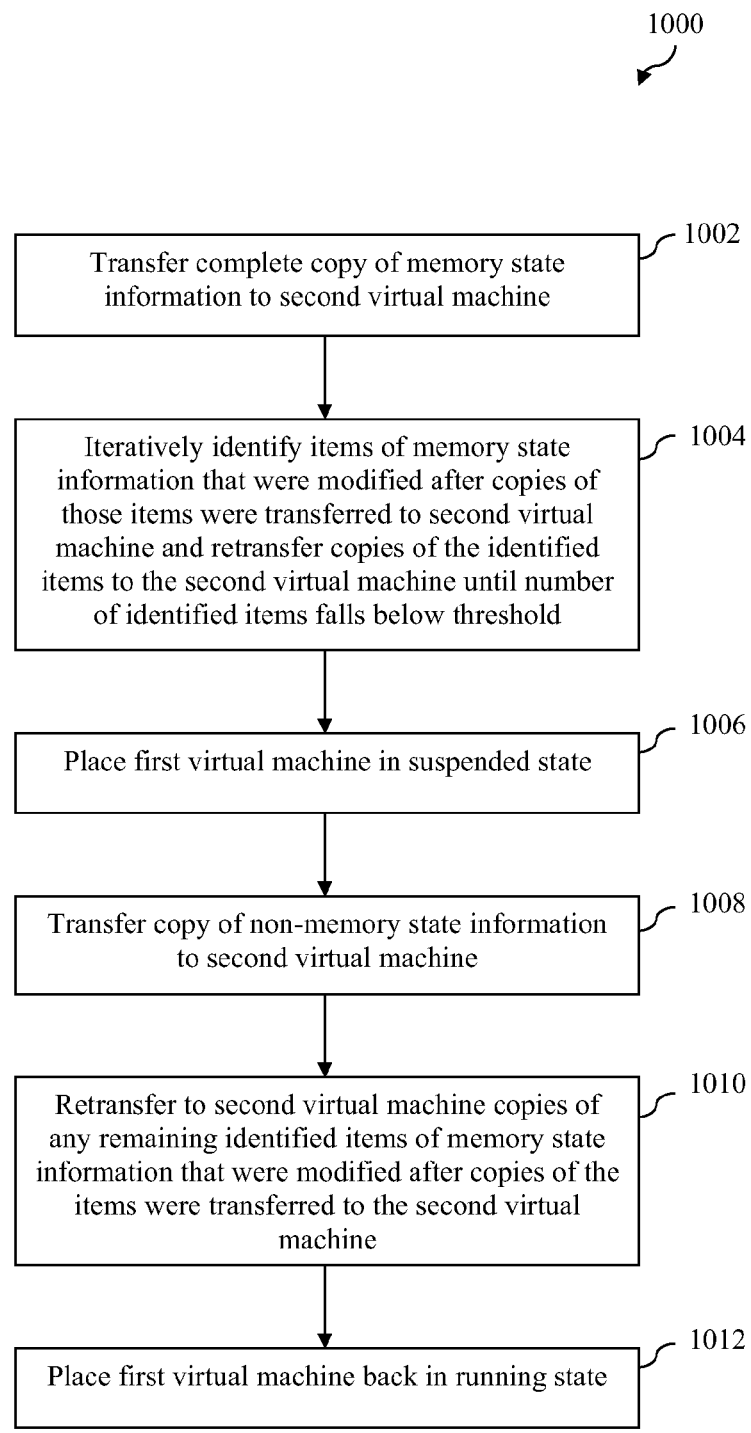
FIG. 10 depicts a flowchart of a method for transferring a copy of memory and non-memory state information associated with a first virtual machine to a second virtual machine.

FIG. 10 depicts a flowchart 1000 of an example method for transferring a copy of memory and non-memory state information associated with a first virtual machine to a second virtual machine in accordance with an embodiment of the present invention. The method of flowchart 1000 may be used, for example, to perform step 904 of flowchart 900 as described above in reference to FIG. 9. The technique shown in flowchart 1000 is an adaptation of a method used for migrating a virtual machine from a first host computer to a second host computer, as described in more detail in U.S. Pat. No. 7,484,208 to Nelson, entitled "Virtual Machine Migration," the entirety of which is incorporated by reference herein. The technique beneficially allows for the fast and transparent transfer of memory and non-memory state information associated with a virtual machine from a first host computer to a second host computer. However, in U.S. Pat. No. 7,484,208, the technique is limited to a virtual machine migration context only.

The method of flowchart 1000 will be described with continued reference to various entities within computing environment 400 of FIG. 4 for the purpose of illustration only. However, the method is not limited to that embodiment. As will be readily appreciated by persons skilled in the relevant art(s) based on the teachings provided herein, the method may be implemented by a wide variety of other entities and/or systems.

As shown in FIG. 10, the method of flowchart 1000 begins at step 1002, in which a complete copy of the memory state information is transferred to the second virtual machine while the first virtual machine is running. For example, with continued reference to computing environment 400 of FIG. 4, first cloning logic 512 and second cloning logic 612 may operate in conjunction to transfer a complete copy of the memory state information associated with first virtual machine 504 to second virtual machine 804 while first virtual machine 504 is running. In an embodiment in which virtual physical memory 534 comprises a plurality of pages, this step may entail transferring a copy of all of the pages of virtual physical memory 534 from first virtual machine 504 to second virtual machine 804.

During the time that the complete copy of the memory state information is being transferred, the first virtual machine, which is allowed to continue running, may modify some of the memory state information that was already transferred. For example, first virtual machine 504 may modify some of the pages of virtual physical memory 534, copies of which were previously transferred to second virtual machine 804. To address this issue, during step 1004, items of memory state information that were modified after copies of those items were transferred to the second virtual machine are identified and copies of the identified items are retransferred to the second virtual machine. This process is repeated in an iterative manner until the number of identified items falls below a predefined threshold. In an embodiment, the items of memory state information comprise pages of virtual physical memory 534. Modifications to these pages may be detected and tracked using any known method, such as a write-protection mechanism or the maintenance of a separate table indicating memory modifications.

At step 1006, responsive to the number of identified items falling below the predefined threshold, the first virtual machine is placed in a suspended state. For example, with continued reference to computing environment 400 of FIG. 4, first cloning logic 512 may place first virtual machine 504 in a suspended state responsive to the number of identified items falling below the predefined threshold.

At step 1008, while the first virtual machine is in the suspended state, the non-memory state information is transferred from the first virtual machine to the second virtual machine. For example, with continued reference to computing environment 400 of FIG. 4, first cloning logic 512 and second cloning logic 612 may operate in conjunction to transfer the non-memory state information from first virtual machine 504 to second virtual machine 804 while first virtual machine 504 is in the suspended state.

At step 1010, while first virtual machine 504 is in the suspended state, copies of any remaining identified items of memory state information that were modified after copies of the items were transferred to the second virtual machine are retransferred to the second virtual machine. For example, with continued reference to computing environment 400 of FIG. 4, first cloning logic 512 and second cloning logic 612 may operate in conjunction to retransfer to second virtual machine 804 copies of any remaining identified items of memory state information (e.g., pages of virtual physical memory 534) that were modified after copies of the items were transferred to second virtual machine 804.

Because the amount of information to be transferred during steps 1008 and 1010 is typically small, the period of time during which the first virtual machine must be suspended to perform steps 1008 and 1010 can be relatively short. By keeping this period of time short, the impact to applications running on the first virtual machine can be kept small and unnoticeable to users thereof.

At step 1012, the first virtual machine is placed back in running state. For example, with continued reference to computing environment 400 of FIG. 4, first cloning logic 512 may place first virtual machine 504 back in a running state.

The foregoing method of flowchart 1000 allows a copy of the first virtual machine to be created in a manner that causes only minimal interruption to the first virtual machine, and applications executing thereon, thereby allowing backups to be obtained at any time and in a manner that is unlikely to substantially impact the performance of the applications and/or frustrate users thereof.

Figure 11:
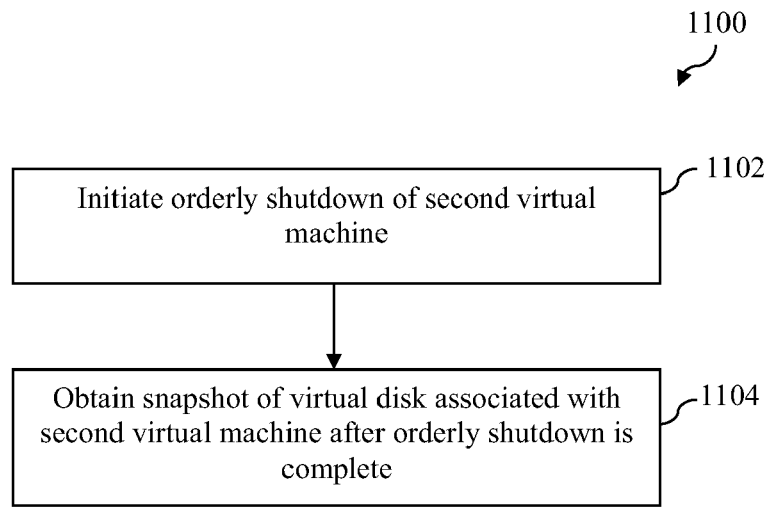
FIG. 11 depicts a flowchart of a first method by which a snapshot of a virtual disk associated with a copy or "clone" of a virtual machine may be obtained.

FIG. 11 depicts a flowchart 1100 of a first method by which a snapshot of a virtual disk associated with a copy or "clone" of a virtual machine may be obtained in accordance with an embodiment of the present invention. The method of flowchart 1100 may be used, for example, to perform step 706 of flowchart 700 as described above in reference to FIG. 7. The method of flowchart 1100 will be described with continued reference to various entities within computing environment 400 of FIG. 4 for the purpose of illustration only. However, the method is not limited to that embodiment. As will be readily appreciated by persons skilled in the relevant art(s) based on the teachings provided herein, the method may be implemented by a wide variety of other entities and/or systems.

In the method of flowchart 1100, the cloned virtual machine is referred to as "the second virtual machine" to maintain consistency with previously described methods. As shown in FIG. 11, the method of flowchart 1100 begins at step 1102, in which an orderly shutdown of the second virtual machine is initiated. For example, with continued reference to computing environment 400 of FIG. 4, a private connection to second virtual machine 804 (such as the private connection to second virtual machine 804 established during step 910 of the method of flowchart 900) may be used to initiate an orderly shutdown of second virtual machine 804. In an alternate implementation, second backup logic 606 may automatically trigger an orderly shutdown of second virtual machine 804 at some point in time after second virtual machine 804 begins running on second host computer 404.

At step 1104, a snapshot of the virtual disk associated with the second virtual machine is obtained after the orderly shutdown of the second virtual machine is complete. For example, with continued reference to computing environment 400 of FIG. 4, second backup logic 606 may obtain a snapshot of virtual disk 836 associated with second virtual machine 804 after the orderly shutdown of second virtual machine 804 is complete. Because the snapshot of the virtual disk is obtained after the orderly shutdown of the second virtual machine is complete, the virtual disk will be in a perfectly consistent state. This beneficially allows for the creation of a perfectly consistent snapshot.

Figure 12:
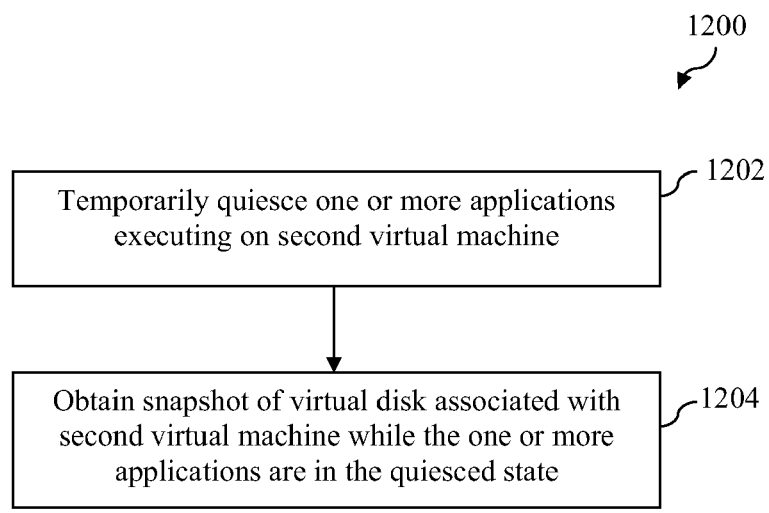
FIG. 12 depicts a flowchart of a second method by which a snapshot of a virtual disk associated with a copy or "clone" of a virtual machine may be obtained.

FIG. 12 depicts a flowchart 1200 of a second method by which a snapshot of a virtual disk associated with a copy or "clone" of a virtual machine may be obtained in accordance with an embodiment of the present invention. Like the method of flowchart 1100, the method of flowchart 1200 may be used, for example, to perform step 706 of flowchart 700 as described above in reference to FIG. 7. The method of flowchart 1200 will be described with continued reference to various entities within computing environment 400 of FIG. 4 for the purpose of illustration only. However, the method is not limited to that embodiment. As will be readily appreciated by persons skilled in the relevant art(s) based on the teachings provided herein, the method may be implemented by a wide variety of other entities and/or systems.

In the method of flowchart 1200, the cloned virtual machine is referred to as "the second virtual machine" to maintain consistency with previously described methods. As shown in FIG. 12, the method of flowchart 1200 begins at step 1202, in which one or more applications executing on the second virtual machine are quiesced. For example, with continued reference to computing environment 400 of FIG. 4, a private connection to second virtual machine 804 (such as the private connection to second virtual machine 804 established during step 910 of the method of flowchart 900) may be used to quiesce application(s) 826 executing on second virtual machine 804. In an alternate implementation, second backup logic 606 may automatically cause application(s) 826 executing on second virtual machine 804 to be placed in a quiesced state at some point in time after second virtual machine 804 begins running on second host computer 404. Placing an application in a quiesced state may include one or more of flushing out in-core updates associated with the application, ensuring that no new update requests associated with the application are serviced, and/or flushing out unwritten pages in the virtual machine file system.

At step 1204, a snapshot of the virtual disk associated with the second virtual machine is obtained while the one or more applications are in the quiesced state. For example, with continued reference to computing environment 400 of FIG. 4, second backup logic 606 may obtain a snapshot of virtual disk 836 associated with second virtual machine 804 while application(s) 826 are in the quiesced state. Because the snapshot of the virtual disk is obtained while the application(s) are in a quiesced state, the virtual disk will be in an application-consistent state. This beneficially allows for the creation of an application-consistent snapshot.

Figure 13:
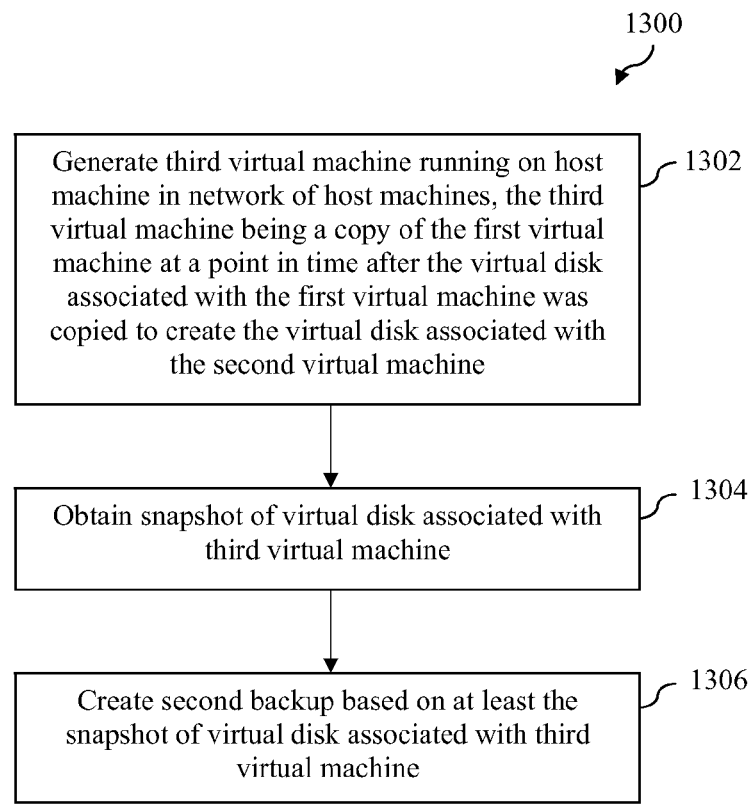
FIG. 13 depicts a flowchart of a method for generating a second backup of a first virtual machine running on a first host computer in a network of host computers.

The foregoing methods describe processes by which a single backup of a first virtual machine running on a first host computer may be generated. However, in accordance with embodiments of the present invention, multiple backups may be generated using similar methods to those previously described. For example, FIG. 13 depicts a flowchart 1300 of a method for generating a second backup of a first virtual machine running on a first host computer in a network of host computers in accordance with an embodiment of the present invention. The method of flowchart 1300 will be described with continued reference to various entities within computing environment 400 of FIG. 4 for the purpose of illustration only. However, the method is not limited to that embodiment. As will be readily appreciated by persons skilled in the relevant art(s) based on the teachings provided herein, the method may be implemented by a wide variety of other entities and/or systems.

The method of flowchart 1300 is performed after the method of flowchart 700. As shown in FIG. 13, the method of flowchart 1300 begins at step 1302, in which a third virtual machine is generated in a running state on a host machine in the network of host machines, the third virtual machine being a copy of the first virtual machine at a point in time after the virtual disk associated with the first virtual machine was copied to create the virtual disk associated with the second virtual machine. For example, with continued reference to computing environment 400 of FIG. 4, the third virtual machine may be generated on second host computer 404 or some other host computer connected to first host computer 402, wherein the third virtual machine is a copy of first virtual machine 504 at a point in time after virtual disk 536 associated with first virtual machine 504 was copied to create virtual disk 836 associated with second virtual machine 804.

At step 1304, a snapshot of a virtual disk associated with the third virtual machine is obtained. For example, with continued reference to computing environment 400 of FIG. 4, the snapshot of the virtual disk associated with the third virtual machine may be obtained in a manner that is similar to the manner in which the snapshot of virtual disk 836 associated with second virtual machine 804 was obtained. For example, the third virtual machine may be shut down in an orderly manner prior to obtaining the snapshot of the virtual disk associated with the third virtual machine.

At step 1306, a second backup is created based on at least the snapshot of virtual disk associated with third virtual machine that was obtained during step 1304.

Ideally, the second and subsequent backups may be created incrementally, thereby conserving system resources. In order to achieve this, a means of tracking differences between the snapshot of the virtual disk associated with the second virtual machine (obtained during step 706 of flowchart 700) and the snapshot of the virtual disk associated with the third virtual machine (obtained during step 1304 of flowchart 1300) must be implemented.

Figure 14:
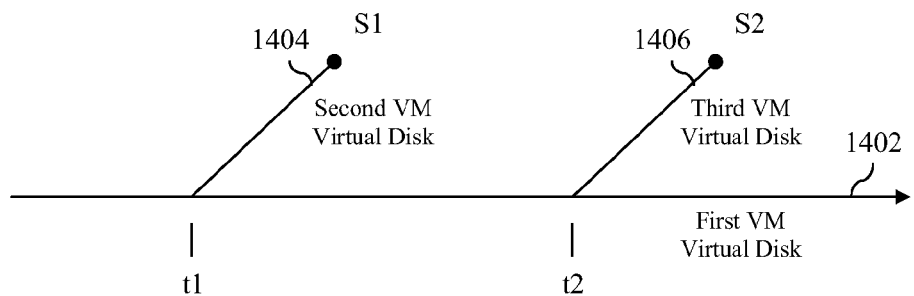
FIG. 14 is a graphical depiction of the evolution of a virtual disk associated with a first virtual machine and cloned virtual disks associated with a second and third virtual machine over time.

The evolution of the virtual disks associated with the first virtual machine, the second virtual machine and the third virtual machine over time is depicted graphically in FIG. 14. In FIG. 14, the state of the virtual disk associated with the first virtual machine over time is represented by the line 1402, the state of the virtual disk associated with the second virtual machine over time is represented by the line 1404, and the state of the virtual disk associated with the third virtual machine over time is represented by the line 1406. As shown in FIG. 14, at a time denoted t1, the virtual disk associated with the first virtual machine is copied (e.g., by taking a writeable snapshot or by some other means) to generate the virtual disk associated with the second virtual machine, thus creating the branch between lines 1402 and 1404. At some subsequent time denoted S1, the second virtual machine is shut down in an orderly manner and a snapshot is taken of the virtual disk associated therewith. In the meantime, the state of the virtual disk associated with the first virtual machine has changed due to writes to that disk and at a subsequent time denoted t2, the virtual disk associated with the first virtual machine is again copied to generate the virtual disk associated with the third virtual machine, thus creating the branch between lines 1402 and 1406. At some subsequent time denoted S2, the third virtual machine is shut down in an orderly manner and a snapshot is taken of the virtual disk associated therewith. It can be seen from this example that in order to identify the differences between the snapshot of the virtual disk associated with the second virtual machine taken at time S1 and the snapshot of the virtual disk associated with the third virtual machine taken at time S2, that all change blocks along the paths from t1 to S1, from t2 to S2 and from t1 to t2 must be identified.

Figure 15:
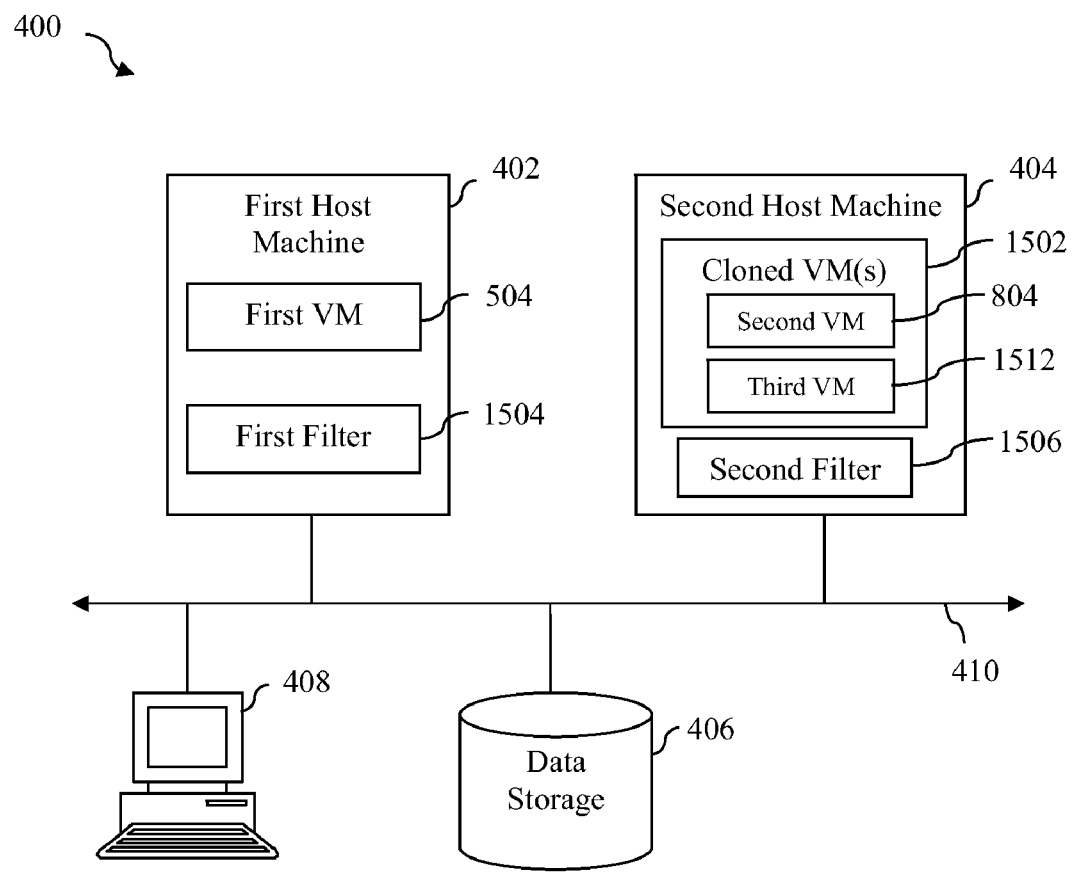
FIG. 15 is a block diagram of an example computer environment in which filters are included within a first host machine and a second host machine to track changed blocks in a plurality of virtual disks.

FIG. 15 depicts an example implementation of computer environment 400 in which filters are included within first host machine 402 and second host machine 404 to track such changed blocks. In particular, as shown in FIG. 15, first host machine includes a first filter 1504 that is configured to track write accesses to virtual disk 536 associated with first virtual machine 504 over time. First filter 1504 can thus identify, for example, all changed blocks along the path from t1 to t2 depicted in FIG. 14. As further shown in FIG. 15, second host machine 404 includes a plurality of cloned virtual machines 1502, which in this example includes at least second virtual machine 804 generated in accordance with flowchart 700 of FIG. 7 and a third virtual machine 1512 generated in accordance with flowchart 1300 of FIG. 13. Second host machine 404 also includes a second filter 1506 that is configured to track write accesses to virtual disk 836 associated with second virtual machine 804 and write accesses to a virtual disk associated with third virtual machine 1512 over time. Second filter 1506 can thus identify, for example, all changed blocks along the path from t1 to S1 depicted in FIG. 14 and all changed blocks along the path from t2 to S2 depicted in FIG. 14. The total set of changed blocks as determined by first filter 1504 and second filter 1506 can be used to determine the difference between the snapshots taken at times S1 and S2, as discussed above, and thereby create an incremental backup.

It is noted that the manner in which first filter 1504 and second filter 1506 are implemented will vary depending upon factors such as whether each virtual disk is implemented as a file (such as a .vhd file) stored on a host computer or as a pass-through disk stored in shared data storage 406 or some other storage medium.

Figure 16:
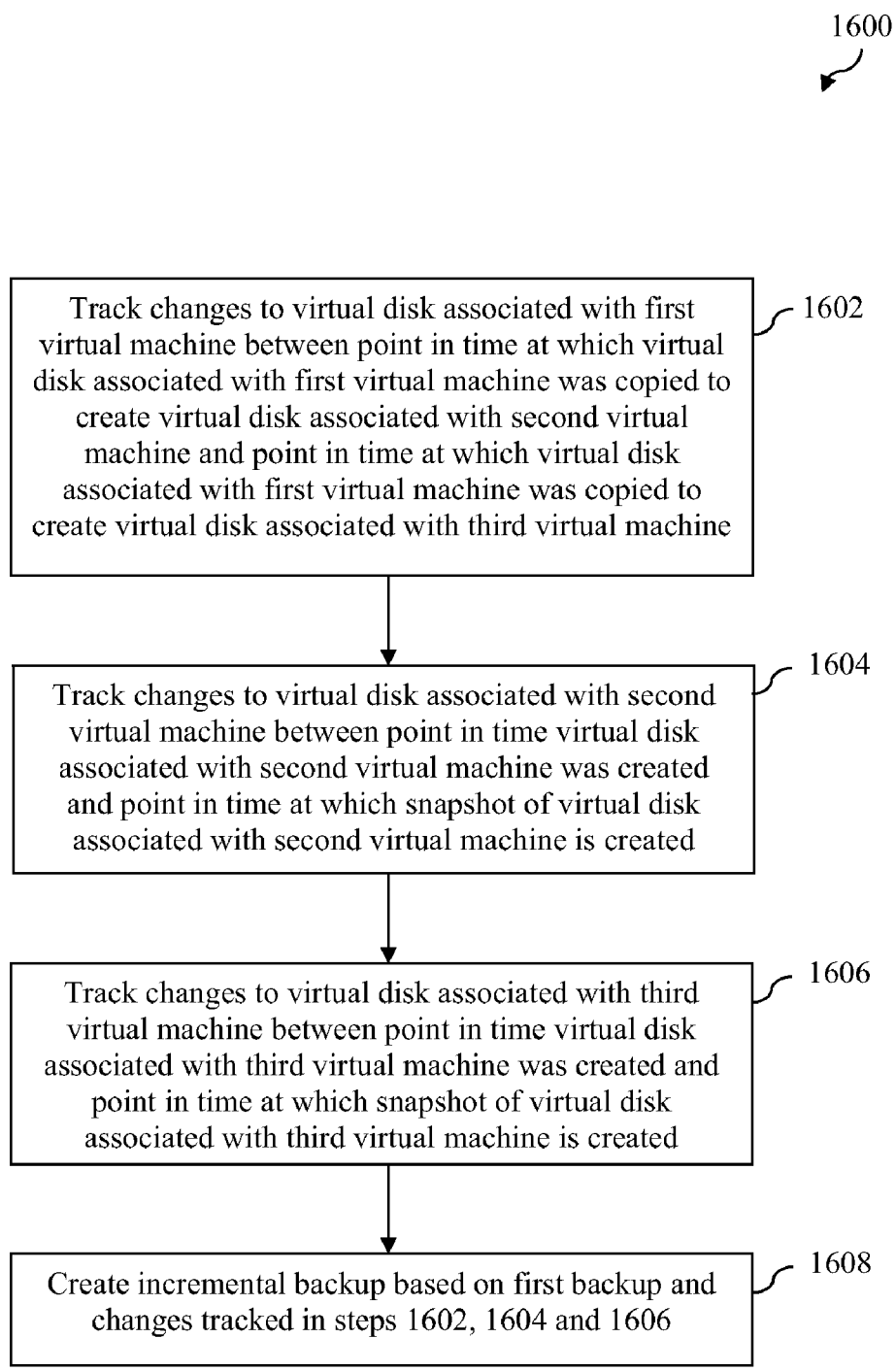
FIG. 16 depicts a flowchart of a method for creating an incremental backup of a virtual machine executing on a first host computer in a network of host computers.

FIG. 16 depicts a flowchart 1600 of a method for creating an incremental backup in accordance with the foregoing technique. The method of flowchart 1600 will be described with continued reference to various entities within computing environment 400 of FIGS. 4 and 15 for the purpose of illustration only. However, the method is not limited to those embodiments. As will be readily appreciated by persons skilled in the relevant art(s) based on the teachings provided herein, the method may be implemented by a wide variety of other entities and/or systems.

As shown in FIG. 16, the method of flowchart 1600 begins at step 1602, in which changes to a virtual disk associated with a first virtual machine are tracked between a point in time at which the virtual disk associated with first virtual machine was copied to create a virtual disk associated with a second virtual machine and a point in time at which the virtual disk associated with first virtual machine was copied to create a virtual disk associated with a third virtual machine. For example, with continued reference to the example computing environment 400 of FIGS. 4 and 15, first filter 1504 tracks changes to virtual disk 536 associated with first virtual machine 504 between a point in time at which virtual disk 536 was copied to create virtual disk 836 associated with second virtual machine 804 and a point in time at which virtual disk 536 was copied to create a virtual disk associated with third virtual machine 1512.

At step 1604, changes to the virtual disk associated with the second virtual machine are tracked between the point in time that the virtual disk associated with the second virtual machine was created and a subsequent point in time at which a snapshot of the virtual disk associated with the second virtual machine is obtained (e.g., after an orderly shutdown of the second virtual machine). For example, with continued reference to the example computing environment 400 of FIGS. 4 and 15, second filter 1506 tracks changes to virtual disk 836 associated with second virtual machine 804 between the point in time that virtual disk 836 was created and a point in time at which a snapshot of virtual disk 836 is obtained.

At step 1606, changes to the virtual disk associated with the third virtual machine are tracked between the point in time that the virtual disk associated with the third virtual machine was created and a subsequent point in time at which a snapshot of the virtual disk associated with the third virtual machine is obtained (e.g., after an orderly shutdown of the third virtual machine). For example, with continued reference to the example computing environment 400 of FIGS. 4 and 15, second filter 1506 tracks changes to the virtual disk associated with third virtual machine 1512 between the point in time that the virtual disk associated with third virtual machine 1512 was created and a point in time at which a snapshot of the virtual disk associated with third virtual machine 1512 is obtained.

At step 1608, the changes tracked in steps 1602, 1604 and 1606 are used to create an incremental backup of the first virtual machine. For example, with continued reference to the example computing environment 400 of FIGS. 4 and 15, second backup logic 606 or other logic executing on second host computer 404 may use the changes tracked in steps 1602, 1604 and 1606 to create an incremental backup of first virtual machine 504.

C. Example Computer System Implementation

Figure 17:
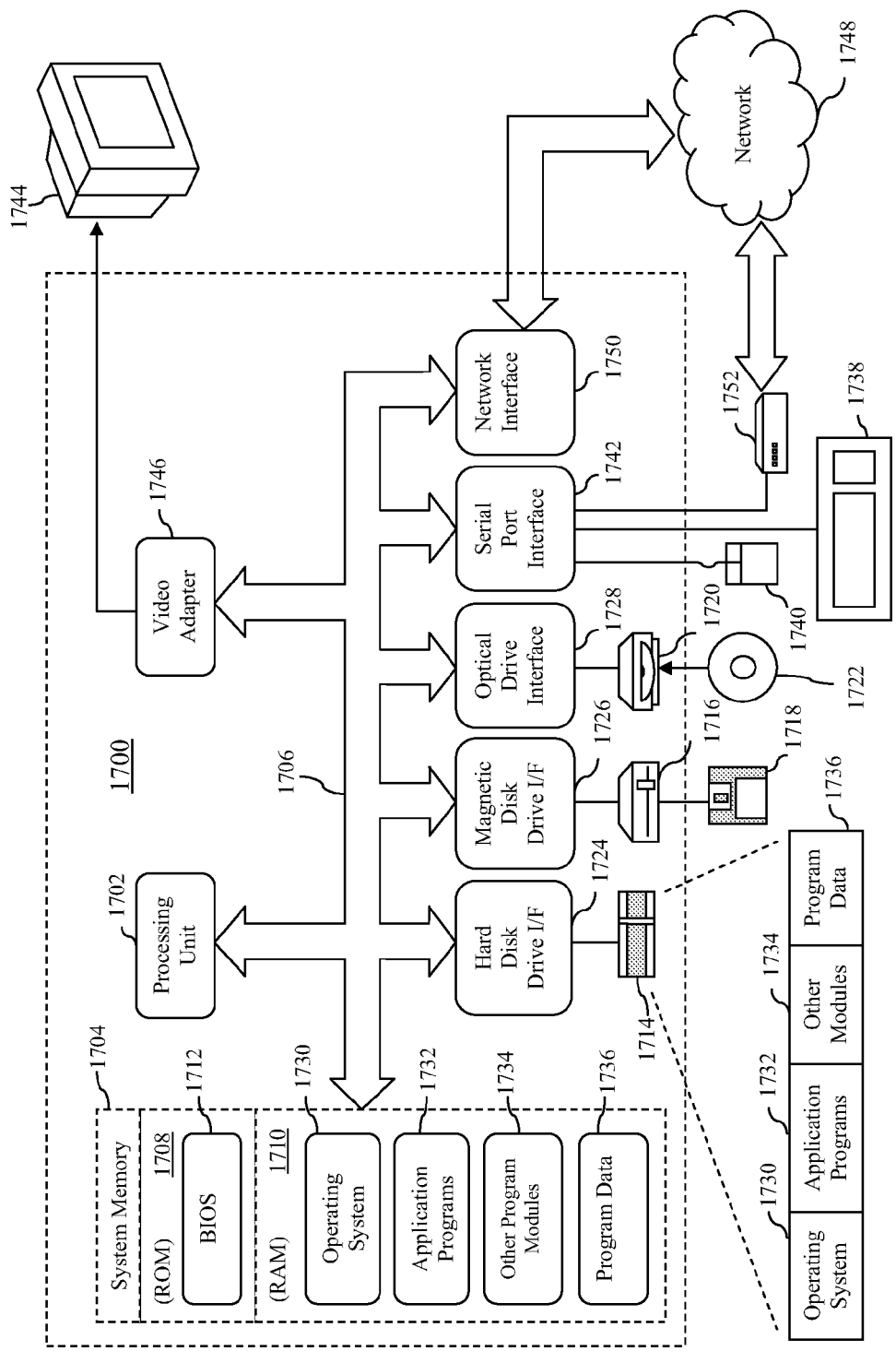
FIG. 17 depicts an example processor-based computer system that may be used to implement various aspects of the present invention.

FIG. 17 depicts an exemplary implementation of a computer system 1700 upon which various aspects of the present invention may be executed. Computer system 1700 is intended to represent a general-purpose computing system in the form of a conventional personal computer. Computer system 1700 may be used to implement, for example, any one of first host computer 202, second host computer 204, or user computer 408 as described above in reference to FIGS. 4-6, 8 and 15.

As shown in FIG. 17, computer system 1700 includes a processing unit 1702, a system memory 1704, and a bus 1706 that couples various system components including system memory 1704 to processing unit 1702. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

Computer system 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1730, one or more application programs 1732, other program modules 1734, and program data 1736. Application programs 1732 or program modules 1734 may include, for example, logic for implementing any or all of the elements of first host computer 202, second host computer 204, or user computer 408 as described above in reference to FIGS. 4-6, 8 and 15. Application programs 1732 or program modules 1734 may also include, for example, logic for implementing one or more of the steps of the flowcharts depicted in FIGS. 7, 9-13 and 16. Thus each step illustrated in those figures is also intended to represent program logic configured to perform the function described by that step.

A user may enter commands and information into computer 1700 through input devices such as keyboard 1738 and pointing device 1740. Other input devices (not shown) may include a microphone, joystick, game pad, satellite dish, scanner, or the like. These and other input devices are often connected to the processing unit 1702 through a serial port interface 1742 that is coupled to bus 1706, but may be connected by other interfaces, such as a parallel port, game port, or a universal serial bus (USB).

A monitor 1744 or other type of display device is also connected to bus 1706 via an interface, such as a video adapter 1746. Monitor 1744 is used to present a GUI that assists a user/operator in configuring and controlling computer 1700. In addition to the monitor, computer 1700 may include other peripheral output devices (not shown) such as speakers and printers.

Computer 1700 is connected to a network 1748 (e.g., a WAN such as the Internet or a LAN) through a network interface 1750, a modem 1752, or other means for establishing communications over the network. Modem 1752, which may be internal or external, is connected to bus 1706 via serial port interface 1742.

As used herein, the terms "computer program medium" and "computer-readable medium" are used to generally refer to media such as the hard disk associated with hard disk drive 1714, removable magnetic disk 1718, removable optical disk 1722, as well as other media such as flash memory cards, digital video disks, random access memories (RAMs), read only memories (ROM), and the like.

As noted above, computer programs (including application programs 1732 and other program modules 1734) may be stored on the hard disk, magnetic disk, optical disk, ROM, or RAM. Such computer programs may also be received via network interface 1750 or serial port interface 1742. Such computer programs, when executed, enable computer 1700 to implement features of the present invention discussed herein. Accordingly, such computer programs represent controllers of computer 1700.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

D. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for creating a backup of a first virtual machine running on a first host computer in a network of host computers, comprising:
    generating a second virtual machine running on a second host computer in the network of host computers, the second virtual machine being a copy of the first virtual machine, said generating comprising:
        generating the second virtual machine in a suspended state on the second host computer;
        transferring a copy of memory and non-memory state information associated with the first virtual machine to the second virtual machine, said transferring comprising:
    while the first virtual machine is running,
        transferring a complete copy of the memory state information to the second virtual machine, and
        iteratively identifying items of the memory state information that were modified after copies of the items were transferred to the second virtual machine and retransferring copies of the identified items to the second virtual machine until the number of identified items falls below a predetermined threshold;
    placing the first virtual machine in a suspended state;
    while the first virtual machine is in the suspended state,
        transferring a copy of the non-memory state information to the second virtual machine; and
        retransferring to the second virtual machine copies of any remaining identified items of memory state information that were modified after copies of the items were transferred to the second virtual machine; and
    placing the first virtual machine back in a running state;
    creating a virtual disk for the second virtual machine, said creating the virtual disk for the second virtual machine comprising obtaining a copy of a virtual disk associated with the first virtual machine; and
    placing the second virtual machine in a running state;
    obtaining a snapshot of the virtual disk associated with the second virtual machine; and
    creating a first backup based on at least the snapshot of the virtual disk associated with the second virtual machine.

2. The method of claim 1, wherein obtaining the snapshot of the virtual disk associated with the second virtual machine comprises:
    initiating an orderly shutdown of the second virtual machine; and
    obtaining the snapshot of the virtual disk associated with the second virtual machine after the orderly shutdown of the second virtual machine is complete.

3. The method of claim 1, wherein obtaining the snapshot of the virtual disk associated with the second virtual machine comprises:
    temporarily quiescing at least one application executing on the second virtual machine; and
    obtaining the snapshot of the virtual disk associated with the second virtual machine while the at least one application is in the quiesced state.

4. The method of claim 1, wherein obtaining a copy of a virtual disk associated with the first virtual machine comprises obtaining a writeable snapshot of the virtual disk associated with the first virtual machine.

5. The method of claim 1, wherein generating the second virtual machine running on the second host computer further comprises:
    disabling one or more connections between the second virtual machine and one or more external entities.

6. The method of claim 5, wherein generating the second virtual machine running on the second host computer further comprises:
    establishing a private connection to the second virtual machine; and
    using the private connection to trigger an orderly shutdown of the second virtual machine prior to the obtaining of the snapshot of the virtual disk associated with the second virtual machine.

7. The method of claim 1, further comprising:
generating a third virtual machine running on a host computer in the network of host computers, the third virtual machine being a copy of the first virtual machine at a point in time after the a virtual disk associated with the first virtual machine was copied to create the virtual disk associated with the second virtual machine;
obtaining a snapshot of a virtual disk associated with the third virtual machine; and
creating a second backup based on at least the snapshot of the virtual disk associated with the third virtual machine.

8. The method of claim 7, wherein creating the second backup based on at least the snapshot of the virtual disk associated with the third virtual machine comprises creating an incremental backup, wherein creating the incremental backup comprises:
tracking changes to the virtual disk associated with the first virtual machine between a point in time at which the virtual disk associated with the first virtual machine was copied to create the virtual disk associated with the second virtual machine and a point in time at which the virtual disk associated with the first virtual machine was copied to create the virtual disk associated with the third virtual machine;
tracking changes to the virtual disk associated with the second virtual machine; and
tracking changes to the virtual disk associated with the third virtual machine.

9. A system, comprising:
a first host computer comprising a first virtualization layer, a first virtual machine executing on the first virtualization layer, first cloning logic within the first virtualization layer, and first backup logic;
a second host computer connected to the first host computer, the second host computer comprising a second virtualization layer, second cloning logic within the second virtualization layer, and second backup logic;
the first and second cloning logic being configured to generate a second virtual machine on the second host computer responsive to the initiation of a backup process by the first and/or second backup logic, the second virtual machine being a copy of the first virtual machine, the first and second cloning logic being configured to generate the second virtual machine running on the second host computer by:
generating the second virtual machine in a suspended state on the second host computer;
transferring a copy of memory and non-memory state information associated with the first virtual machine to the second virtual machine, the first and second cloning logic being configured to transfer the copy of the memory and non-memory state information associated with the first virtual machine to the second virtual machine by:
while the first virtual machine is running,
transferring a complete copy of the memory state information to the second virtual machine; and
iteratively identifying items of the memory state information that were modified after copies of the items were transferred to the second virtual machine and retransferring copies of the identified items to the second virtual machine until the number of identified items falls below a predetermined threshold;
placing the first virtual machine in a suspended state;
while the first virtual machine is in the suspended state,
transferring a copy of the non-memory state information to the second virtual machine; and
retransferring to the second virtual machine copies of any remaining identified items of memory state information that were modified after copies of the items were transferred to the second virtual machine; and
placing the first virtual machine back in a running state;
creating a virtual disk for the second virtual machine, said creating the virtual disk for the second virtual machine comprising obtaining a copy of a virtual disk associated with the first virtual machine; and
placing the second virtual machine in a running state;
the second backup logic being configured to obtain a snapshot of the virtual disk associated with the second virtual machine and to create a first backup based on at least the snapshot of the virtual disk associated with the second virtual machine.

10. The system of claim 9, wherein the second backup logic is configured to initiate an orderly shutdown of the second virtual machine and obtain the snapshot of the virtual disk associated with the second virtual machine after the orderly shutdown of the second virtual machine is complete.

11. The system of claim 9, wherein the second backup logic is configured to temporarily quiesce at least one application executing on the second virtual machine and obtain the snapshot of the virtual disk associated with the second virtual machine while the at least one application is in the quiesced state.

12. The system of claim 9, wherein the first and second cloning logic is configured to obtain a copy of the virtual disk associated with the first virtual machine by obtaining a writeable snapshot of the virtual disk associated with the first virtual machine.

13. The system of claim 9, wherein the first and second cloning logic is configured to generate the second virtual machine running on the second host computer by disabling one or more connections between the second virtual machine and one or more external entities.

14. The system of claim 13, wherein the first and second cloning logic is further configured to generate the second virtual machine running on the second host computer by establishing a private connection to the second virtual machine and using the private connection to trigger an orderly shutdown of the second virtual machine prior to the obtaining of the snapshot of the virtual disk associated with the second virtual machine.

15. A method for creating a backup of a first virtual machine running on a first host computer in a network of host computers, comprising:
generating a second virtual machine running on a second host computer in the network of host computers, the second virtual machine being a copy of the first virtual machine;
obtaining a snapshot of a virtual disk associated with the second virtual machine;
generating a third virtual machine running on the second host computer, the third virtual machine being a copy of the first virtual machine;
obtaining a snapshot of a virtual disk associated with the third virtual machine; and
creating an incremental backup based on at least the snapshot of the virtual disk associated with the second virtual machine and the snapshot of the virtual disk associated with the third virtual machine.

16. The method of claim 15, wherein creating the incremental backup comprises:
- tracking changes to a virtual disk associated with the first host computer between a point in time at which the virtual disk associated with the first host computer was copied to create the virtual disk associated with the second virtual machine and a point in time at which the virtual disk associated with the first host computer was copied to create the virtual disk associated with the third virtual machine;
- tracking changes to the virtual disk associated with the second virtual machine between a point in time at which the virtual disk associated with the second virtual machine was created and a point in time at which the snapshot of the virtual disk associated with the second virtual machine was obtained; and
- tracking changes to the virtual disk associated with the third virtual machine between a point in time at which the virtual disk associated with the third virtual machine was created and a point in time at which the snapshot of the virtual disk associated with the third virtual machine was obtained.

17. A method for creating a backup of a first virtual machine running on a first host computer in a network of host computers, comprising:
- generating a second virtual machine running on a second host computer in the network of host computers, the second virtual machine being a copy of the first virtual machine;
- obtaining a snapshot of a virtual disk associated with the second virtual machine;
- creating a first backup based on at least the snapshot of the virtual disk associated with the second virtual machine;
- generating a third virtual machine running on a host computer in the network of host computers, the third virtual machine being a copy of the first virtual machine at a point in time after the a virtual disk associated with the first virtual machine was copied to create the virtual disk associated with the second virtual machine;
- obtaining a snapshot of a virtual disk associated with the third virtual machine; and
- creating a second backup based on at least the snapshot of the virtual disk associated with the third virtual machine.

18. The method of claim 17, wherein creating the second backup based on at least the snapshot of the virtual disk associated with the third virtual machine comprises creating an incremental backup, wherein creating the incremental backup comprises:
- tracking changes to the virtual disk associated with the first virtual machine between a point in time at which the virtual disk associated with the first virtual machine was copied to create the virtual disk associated with the second virtual machine and a point in time at which the virtual disk associated with the first virtual machine was copied to create the virtual disk associated with the third virtual machine;
- tracking changes to the virtual disk associated with the second virtual machine; and
- tracking changes to the virtual disk associated with the third virtual machine.

\* \* \* \* \*